US 6,268,929 B1
Jul. 31, 2001

(54) DATA PROCESSING DEVICE FOR SIMULTANEOUSLY READING OUT PLURAL LINES OF IMAGE AND A METHOD THEREFOR (75) Inventor: Kenichi Ono, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/104,325

(22) Filed: Jun. 25, 1998

(30) Foreign Application Priority Data

Jun. 25, 1997 (JP) .................................................... 9-168310

(51) Int. Cl.[7] .............................. B41B 15/00; B41J 15/00; G06F 12/00; G06F 12/02

(52) U.S. Cl. ........................... 358/1.6; 358/1.9; 358/1.13; 358/1.16; 358/1.17; 358/404; 358/444; 711/168; 345/507; 345/531; 345/536; 345/554

(58) Field of Search ..................................... 358/298, 300, 358/302, 296, 515, 518, 523, 1.9, 1.13, 1.16, 1.17, 1.6, 404, 444; 345/507, 531, 536, 554; 711/168; 710/53

(56) References Cited

U.S. PATENT DOCUMENTS 5,258,780 * 11/1993 Ema et al. ............................. 358/298
5,652,660 * 7/1997 Seto et al. .............................. 358/448

* cited by examiner

Primary Examiner—Edward Coles
Assistant Examiner—Twyler Lamb
(74) Attorney, Agent, or Firm—Oblon, Spivak, McClelland, Maier & Neustadt, P.C.

(57) ABSTRACT

A data processing device and a method by which image data inputted line by line can be distributed as image data of the plural lines, and processing of the image data and converting the image data to a multiple beam image data can be performed by use of separate memories. The data processing device includes a data inputting mechanism configured to generate line by line in order dot-matrix-state data in synchronism with an input clock; at least m memories having a memorizing capacity capable of memorizing one or more lines of the dot-matrix-state data generated by the data inputting medium, wherein m is an integer equal to or greater than n×2, and n is another integer equal to or greater than two; a memory writing-in mechanism configured to write the dot-matrix-state data from the data inputting medium line by line in order into the at least m memories in synchronism with the input clock during a write-in period; a memory reading-out control mechanism configured to write in n lines of data generated by the data inputting mechanism line by line in order into n memories among the at least m memories in synchronism with the input clock, to simultaneously read out (m−n)-lines of data from memories other than the n memories in synchronism with a printing clock during the write-in period, and to change the memory for reading out the data stored in the at least m memories and to repeat the operation of reading-out the image data whenever the n-lines of data are written into the n memories; and n image processing mechanisms configured to output printing image data on respective lines on the basis of plural-lines of image data read out from the n memories.

4 Claims, 7 Drawing Sheets

DATA PROCESSING DEVICE FOR SIMULTANEOUSLY READING OUT PLURAL LINES OF IMAGE AND A METHOD THEREFOR

BACKGROUND OF THE INVENTION

1. Field of the Invention

The present invention relates to a data processing device for a laser printer, a digital copying machine, a facsimile device, etc., in particular, a data processing device including an apparatus for simultaneously or almost simultaneously reading out plural lines of image, and a method therefor.

2. Discussion of the Background

Conventionally, regarding the image forming apparatus for use in the laser printer, a digital copying machine, a facsimile device, etc., there has been used a single beam type image forming apparatus carrying therein a writing-in apparatus in which the scanning operation is performed on the photosensitive body in the main scanning direction with a line of laser beam emitted from a recording light source composed of a laser diode modulated by the image data by use of a scanning medium constructed with a polygon mirror, and the image of one line is written in respectively per one line in order on the photosensitive body by moving the photosensitive body in the subscanning direction.

Furthermore, there has been proposed a multiple beam type image forming apparatus carrying therein a writing-in apparatus in which the scanning operation is performed in the main scanning direction on the photosensitive body with the plural lines of the laser beam emitted from the recording light source composed of plural laser diodes independently modulated by the image data, and the image of plural lines is written in on the photosensitive body simultaneously or almost simultaneously by moving the photosensitive body in the subscanning direction.

Since such multiple beam type image forming apparatus can perform the operation of writing in the image of plural lines simultaneously or almost simultaneously by use of one surface of the polygon mirror, the apparatus is featured in that the image can be written in with high speed by use of a low-revolution polygon mirror and a low-output-power laser diode.

In the case of inputting the image data into the above-mentioned image forming apparatus, the single beam type image forming apparatus carrying therein a writing-in apparatus including a single laser diode or the multiple beam type image forming apparatus carrying therein another writing-in apparatus including plural laser diodes is employed. However, regardless of the type of such image forming apparatus to be employed, the image data per one line are inputted pixel by pixel, or pixels by pixels by incrementing the address in the main scanning direction with a predetermined input clock after resetting the address in the main scanning direction with a line synchronization signal, and then such operations are repeated.

In the multiple beam type image forming apparatus, since the image data of plural lines are written in simultaneously or almost simultaneously by use of the plural lines of the laser beam from the plural laser diodes, it is necessary to distribute simultaneously or almost simultaneously the image data to be inputted line by line to the image data of the plural lines synchronized with the print clock for modulating the plural laser diodes.

If the scanning position of the plural lines of laser beam from the plural laser diodes is aligned in the main scanning direction, it may be allowed that a single laser diode is modulated with the image data of one line taking a timing with one laser beam, and the remaining respective diodes are respectively modulated with the image data per one line taking the same timing as mentioned above.

However, it may be optically difficult to align the plural laser beam in the main scanning and to keep the pitch of the plural laser beams in the subscanning direction to a value, for instance, 63.5 $\mu$m (400 dpi). Furthermore, since it is required to accomplish a function of enabling to change the density of the writing-in, it may turn out to be further very difficult to change over the pitch of the plural laser beams in the subscanning direction in accordance with the density of the writing-in.

In such situation, the scanning positions of the plural lines of the laser beams are parted from each other to some extent, and the laser light emitting section including the plural laser diodes is rotated. Thereby, methods of adjusting the pitch of the plural lines of the laser beam in the subscanning direction and changing over the pitch thereof have been proposed hitherto. In such system, since the phases in the light emission timings of the plural lines of the laser beam are different from each other, it is necessary to individually control the light emission timings.

The published specification of Japanese Published Patent Publication No. 8-34537/1996 describes the construction and the system of a buffer memory regarding the multiple beam type image forming apparatus. It further describes that the image data are read out from the buffer memory by use of an address signal generated by plural counting media for counting plural clock signals generated on the basis of plural beam detecting signals and a common standard clock, and plural light beams are modulated with the image data thus read out.

Regarding the multiple beam type image forming apparatus described in the published specification of Japanese Patent Publication No. 8-34537/1996, to state more concretely, such image forming apparatus in which a photosensitive member is scanned with n light beams (n is integer equal to or more than 2) and the synchronization is taken in the main scanning direction on the basis of a detection signal for detecting n beams obtained by detecting the aforementioned n light beams by use of a beam detecting media is featured by a synchronization clock generating medium for generating n clock signals individually synchronized with the n beam detecting signals, and n counting media for respectively counting one of the aforementioned n clock signals in order to generate n address signals to be renewed individually in synchronism with the aforementioned n beam detecting signals. Furthermore, the image forming apparatus is featured in that, the respective memorizing media, in parallel operation with the writing-in of the image data to one buffer memory, the image data are read out from the other buffer memory by use of one of the n address signals to be renewed individually in synchronism with the aforementioned n beam detecting signal.

Consequently, the n image data of the output timing in accordance with the detecting timing of the n light beams can be outputted as the signal for modulating the aforementioned n light beams.

On the other hand, there has existed a so-called "smoothing process" for deciding the lighting-up time and the lighting-up timing for the laser beam of the pixel to be noted in accordance with the information of the noted pixel and the circumferential pixel thereof, and for reducing the extents of the slanted line of the image edge portion and the notches of the circular arc thereof.

In such smoothing process, etc., that is, an image forming process requiring the information of the circumferential pixels of the noted pixel, plural lines of the line memory are prepared, and then the feature of the noted pixel is extracted and thereby the image data are decided in accordance with the information of the noted pixel and the circumferential pixels thereof by use of the matrix formed reading out at the same time the plural lines of the image data stored in the line memory.

The aforementioned published specification of Japanese Published Patent Publication No. 8-34537 describes that, in the multiple beam type image forming apparatus, the timing of scanning the plural lines of the light beam are arranged properly (made uniform). However, the above specification does not describe that the image data to be inputted line by line are distributed to the plural lines of the image data employed in order to respectively modulate the plural lines of the plural light beams. Furthermore, since the image data read out from the plural buffer memories are respectively asynchronous, not only the above n counting media but the signal process circuits for processing the read-out image data are required corresponding to the predetermined numbers of the light beams, and consequently, the structure of the image forming apparatus becomes further complicated. As the result, the manufacturing cost may be increased inevitably.

Furthermore, the conventional image forming process such as smoothing process has utilized an original line memory (of its own). On the other hand, the other operations of converting the speed of the image data and transforming the image data to the multiple beam have been performed by the other memory.

SUMMARY OF THE INVENTION

The present invention was made in consideration of the above-mentioned problems in order to improve thereon and provide solutions thereto.

It is another object of the present invention to provide an improved data processing device for writing in plural lines of image simultaneously.

It is still another object of the present invention to provide a low-cost data processing device capable of performing image processing of data being sent in order line by line with a timing in synchronism with an input clock in accordance with information of a circumferential element including in a subscanning direction.

It is still another object of the present invention to provide a low-cost data processing device capable of converting data being sent in order line by line with timing in synchronism with an input clock to the image data of plural lines with the timing in synchronism with the print clock utilizing a memory necessary for processing the image.

It is still another object of the present invention to provide a low-cost data processing device capable of obtaining the image data of plural lines having phases respectively different from each other by use of (n−1) delaying media.

It is still another object of the present invention to provide a low-cost data processing device capable of commonly using the signal processing circuit with the image data of plural lines for modulating the plural lines of the light beam.

It is still another object of the present invention to provide a low-cost data processing device capable of performing image processing of the data being sent in order line by line with timing in synchronism with an input clock in accordance with information of a circumferential element included in a subscanning direction, converting the data being sent in order line by line with the timing in synchronism with the input clock to image data of plural lines with the timing in synchronism with a print clock utilizing a memory necessary for processing the image, obtaining the image data of plural lines having phases respectively different from each other by use of (n−1) delaying media, and commonly using the signal processing circuit with the image data of plural lines for modulating the plural lines of the light beam.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The preferred embodiment of first and second aspects of the invention are described hereinafter. In order to attain the above-mentioned objects, the data processing device for reading out plural lines of image simultaneously according to a first aspect of the invention is composed of a data inputting medium for generating line by line in order dot-matrix-state data in synchronism with an input clock, memories equal to or more than m having a memorizing capacity capable of memorizing one or more lines of the dot-matrix-state data generated by the data inputting medium, wherein m is an integer equal to or more than n×2 and n is another natural number equal to or more than two, a memory writing-in medium for writing in the dot-matrix-state data from the data inputting medium line by line in order into the memories equal to or more than m in synchronism with the input clock, a memory reading out control medium for writing in n-lines of data generated by the data inputting medium line by line in order into n memories among the memories equal to or more than m in synchronism with the input clock, for reading out simultaneously (m−n)-lines of data from the memories excluding the n memories in synchronism with a printing clock during the above writing-in period, and for changing the memory for reading out the data stored in the memories equal to or more than m and repeating the operation of reading-out the image data whenever the n-lines of data are written into the memories, and n image processing media for outputting printing image data on the respective lines on the basis of the plural-lines data read out from the memories.

In such structure of the first aspect of the invention, the image processing of the data transmitted in order line by line with the timing in synchronism with the input clock can be performed in accordance with the information of the circumferential pixels including the subscanning direction. Furthermore, utilizing the memory necessary for the image processing, the data transmitted in order line by line with the timing in synchronism with the input clock can be converted to the plural lines image data of the timing in synchronism with the print clock.

Furthermore, in order to attain the above-mentioned objects, the data processing device for reading out plural lines of image simultaneously according to the second invention status is composed of a data inputting medium for generating line by line in order dot-matrix-state data in synchronism with an input clock, memories equal to or more than m having a memorizing capacity capable of memorizing one or more lines of said dot-matrix-state data generated by said data inputting medium, wherein m is a natural number equal to or more than n×2 and n is another natural number equal to or more than two, a memory writing-in medium for writing in said dot-matrix-state data from the data inputting medium line by line in order into the memories equal to or more than m in synchronism with the input clock, a memory reading-out control medium for writing in n-lines of data generated by the data inputting medium line by line in order into n memories among the memories equal to or more than m in synchronism with the input clock, for reading out simultaneously (m−n)-lines of data from the memories excluding the n memories in synchronism with a printing clock of the earliest timing among n printing clocks during the above writing-in period, and for changing the memory for reading out the data stored in the memories equal to or more than m and repeating the operation of reading-out the image data whenever the n-lines of data are written in into the memories, n image processing media for outputting printing image data on the respective lines on the basis of the plural-lines data read out from the memories, and (n−1) delay medium for respectively delaying the data on respective lines excluding the data on the line to be printed with earliest timing among the data respectively having delay times different from each other and outputted from said n image processing medium.

In such structure according to the second aspect of the invention, the image processing of the data transmitted in order line by line with the timing in synchronism with the input clock can be performed in accordance with the information of the circumferential pixels including the subscanning direction. Furthermore, utilizing the memory necessary for the image pixels in processing, the data transmitted in order line by line with the timing in synchronism with the input clock can be converted to the plural lines image data of the timing in synchronism with the print clock.

Furthermore, the image data of plural lines which are different in phase from each other can be obtained by use of the (n−1) delay media, and the signal processing circuit can be commonly used with the plural lines image data for modulating the plural lines light beam. Consequently, a low-cost apparatus can be realized.

Figure 2:
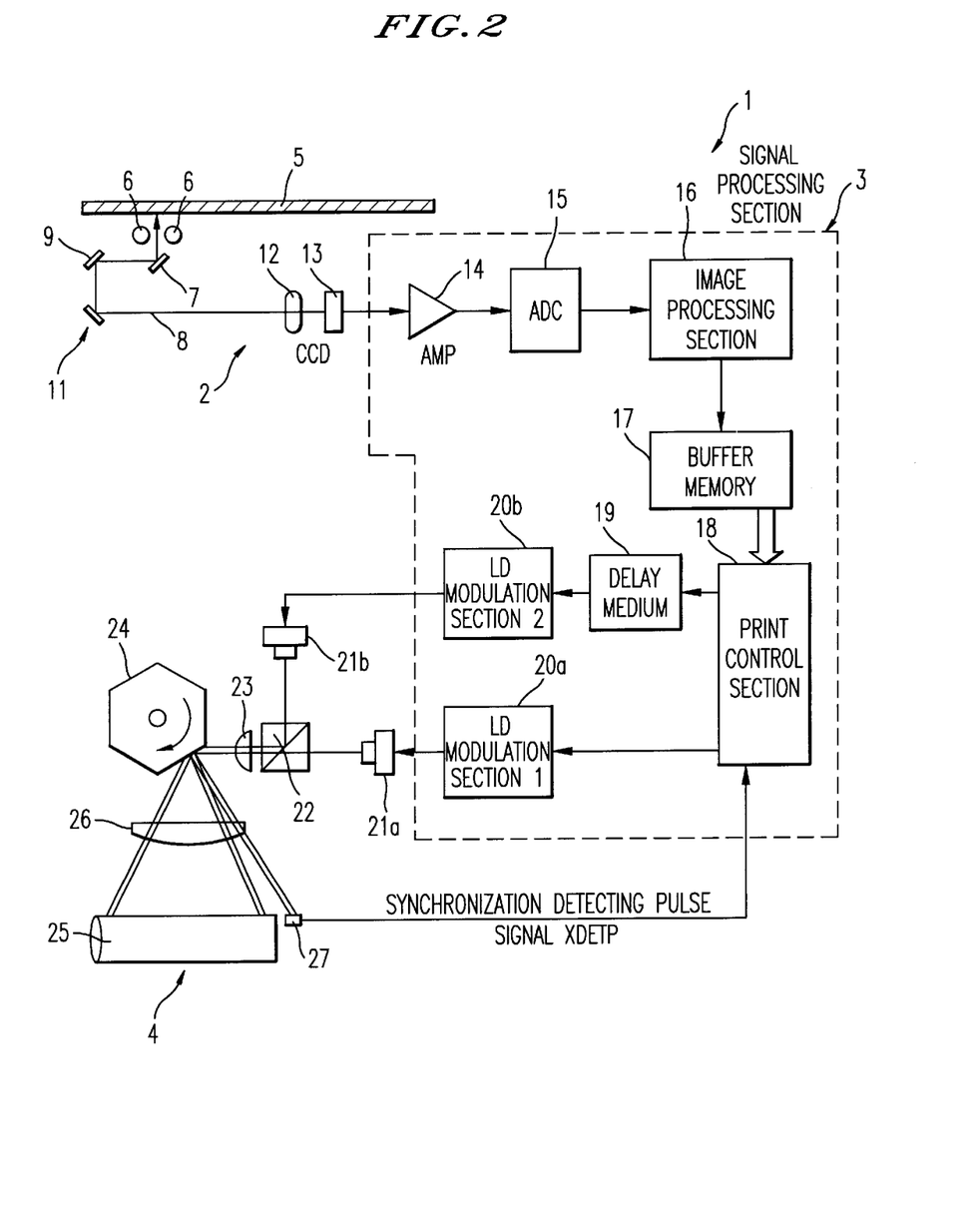
FIG. 2 is a schematic block diagram illustrating the structure of the embodiment.

FIG. 2 shows embodiments of the present invention relating to the first and second aspects of the invention. To state more concretely, those are the embodiments of image forming apparatus including a digital copying machine employed as the digital processing device using two semiconductor lasers-laser diodes (hereinafter, called "LD") unit as the recording light source.

The digital copying machine 1 includes an image reading-out section 2 for reading out and inputting the image to be printed of the manuscript document not shown (in FIG. 2), a signal processing section 3 for executing various processings for the image data inputted by the image reading out section 2, and an image printing section 4 for printing the image data outputted from the signal processing section 3 on the printing material composed of the printing paper not shown and for outputting the printed paper therefrom.

In the image reading out section 2, a first scanning unit 8 composed of a light source 6 and a reflection mirror both formed in a state of long line elongated in the main scanning direction and a second scanning unit 11 composed of a pair of reflection mirrors 9 and 10 are supported under the manuscript document mounting stand 5 so as to be able to move in the subscanning direction with a 2:1 speed ratio, and the photographing elements respectively composed of a focusing optical system 12 and a CCD (Charge Coupled Device) sensor 13.

The signal processing section 3 is composed of an amplifier 14 connected to the CCD sensor 13 of the image reading-out section 2, an ADC (Analog/Digital Converter) 15 for performing the analog-to-digital conversion of the image data from the amplifier 14, an image processing section 16 for executing the various processings for the image data from the ADC 15, a buffer memory for temporarily storing the image data from the image processing section 16, a print control section 18 for converting the image data made in the form of two-lines to the two-lines image data for modulating the two LDs emitting the light as two lines of light beam (laser beam) to be scanned simultaneously (or almost simultaneously) by controlling the timing of reading out the image data from the buffer memory 17 in such a manner as mentioned later, and for performing the smoothing process of the image data at the same time, a delay medium 19 for delaying one-line image data among the image data made in the form of two-lines from the print control section 18, and two LD modulating sections 20a and 20b for driving and controlling the image print section 4 on the basis of the not-delayed one-line image data from the print control section 18 and the other one-line image data from the delay medium 19.

The image printing section 4 includes LD units 21a and 21b, which may respectively contain the LD modulating sections 20a and 20b, generating the light beam (laser beam) modulated in accordance with the image data, a beam splitter 22, a cylinder lens 23, a polygon mirror 24 employed as the scanning medium for scanning the laser beams generated from the respective LD units 21a and 21b, and a motor not shown for rotating the polygon mirror 24 with a constant revolution.

Furthermore, the image printing section 4 includes an fθ lens 26 for focusing the laser beam scanned by the polygon mirror 24 onto the photosensitive drum 25 at a predetermined interval in the subscanning direction and thereby forming the image thereon and for performing the scanning operation in the main scanning direction with a constant (equal) speed, a photosensitive body 25, and a synchronization detector composed of a light detector employed as a beam detecting medium. As the photosensitive body 25, for instance, a photosensitive drum is employed. The synchronization detector 27 is disposed on a position in front of effectively writing-in area in the main scanning direction, and the detector 27 receives the laser beam from the fθ lens 26 and generates the beam detection signal which is fed back to the print control section 18 in the signal processing section 3 as the synchronization detecting pulse signal XDETP.

In the image printing section 4, the two lines of laser beam respectively generated from the LD units 21a and 21b are composed by the beam splitter 22, and thereafter deflected and scanned by the polygon mirror 24 through the cylinder lens 23. The composed laser beam thus deflected and scanned is focused onto the photosensitive body 25 and the synchronization detector 27. Although the two lines of laser beam respectively emitted from the LD units 21a and 21b are deflected and scanned on the same surface of the polygon mirror, the laser beam emitted from the first LD unit 21a is scanned prior to the laser beam emitted from the second LD unit 21b.

Moreover, in this embodiment, two pieces of the LD units (21a, 21b) are employed as the recording light source. However, the number of the recording light sources is not limited to "two", or it may be allowed that an LD array made by putting a plurality of laser light sources in a package is employed as the recording light source.

In the digital copying machine 1 of such construction, the image data generated by reading out the image of the manuscript document by use of the image reading-out section 2 are inputted, and the image data thus inputted are printed out on the printing (recording) paper by the printing section 4 through the signal processing section 3. The image data are outputted in such way. In the process as mentioned above, the image data are temporarily stored in the signal processing section 3, and the inputting speed of the image reading-out section 2 and the outputting speed of the image printing section 4 are adjusted. At this time, the image data are converted such that the image data inputted in order line by line by the image reading-out section 2 are outputted at the same time by two lines.

To state in more detail, in such digital copying machine 1, the image to be printed of the manuscript document mounted on the manuscript document stand 5 is read out and scanned in the subscanning direction by the action of the movement of the first and second scanning units 8 and 11, and focused on the CCD sensor 13 by the focusing optical system 12. Namely, the manuscript document on the stand 5 is illuminated by the light source 6, and the reflection light reflected on the surface of the document is focused on the CCD sensor 13 by the image-focusing optical system 12 through the reflection mirrors 7,9 and 10, and the manuscript document on the stand 5 is scanned in the subscanning direction by the action of the movement of the first and second scanning units 8 and 11.

The CCD sensor 13 outputs the image data in a dot-matrix state formed as the plural main scanning lines successively arranged in the subscanning direction line by line (line means one main scanning line) to the signal processing section 3. At this time, the CCD sensor 13 resets the address for the one-line image data by use of the line synchronization signal LSYNC and thereafter outputs the pixels one by one in the main scanning direction with the predetermined image data. In such way, the image data are outputted line by line to the signal processing section 3 with the predetermined line period decided depending on the scanning speed of the second scanning unit 11 and the reading-out period of the CCD sensor 13.

In the signal processing section 3, the image data are inputted in order line by line from the CCD sensor 13 in the image reading-out section 2, are amplified by the amplifier 14 and converted from analog value to digital value by the ADC 15, and then inputted in the buffer memory 17 after executing various processes, such as a brightness compensating process, a magnification/reduction process, and an editing process in the image processing section 16. Plural lines of the image data are read out at the same time from the buffer memory 17 to the print control section 18 in accordance with the timing control signal from the print control section 18.

The print control section 18 creates two sheets of matrix for use in generation of the two laser beams in accordance with the plural lines of image data read out from the buffer memory 17, and then extracts the features of the respective pixels to be noted referring to the information of the respective pixels to be noted and the surrounding pixels thereof by using the respective matrices.

Furthermore, the print control section 18 decides the image data of the respective pixels to be noted so as to reduce the slanted lines at the edge portion of the image and the notches of circular arc, executes various processings such as respective area limitations and pattern compositions, etc., and then outputs the image data thus processed.

The image data for the one-line LD unit 21a preceding in the main scanning direction among the two-lines image data outputted from the print control section 18 are outputted to the LD modulation section 20a.

The image data for the one-line LD unit 21b following (subsequent thereto) in the main scanning direction among the two-lines image data outputted from the print control section 18 are delayed by the delay medium 19 by a time corresponding to the distance in the main scanning direction of two lines of the laser beam radiated onto the photosensitive body 25, and the image data thus delayed are outputted to the LD modulation section 20b.

The LD modulation sections 20a and 20b respectively output to the LD units 21a and 21b the drive current for modulating the respective LD units 21a and 21b of the image printing section 4 in correspondence with the two-lines image data respectively inputted from the print control section 18 and the delay medium 19.

In the image print section 4, the respective LD units 21a and 21b are driven respectively in correspondence with the two-lines image data by the LD modulation sections 20a and 20b and the units 21a and 21b emit two lines of the laser beam correspondingly respectively modulated. The two-lines laser beams are composed by the beam splitter 22, focused by the cylinder lens 23, deflected and scanned by the polygon mirror 24, and compensated by the fµ lens 26. Thereafter, the laser beams thus processed are focused so as to form the image on the surface to be scanned on the photosensitive body 25 moving in the subscanning direction.

The photosensitive body 25 is driven by the rotatively driving section in the subscanning direction and uniformly charged by use of a charger not shown. Thereafter, the photosensitive body 25 is repeatedly scanned in the main scanning direction with the two lines of laser beam from the fµ lens 26. Consequently, the two-lines image is written on the surface of the photosensitive body 25, and thereby an electrostatic latent image in the state of a dot-matrix is formed thereon. The electrostatic latent image on the photosensitive body 25 is developed by a developing medium not shown and thereby converted to a toner image. The toner image thus converted is transferred to the printing (recording) paper by a transfer medium not shown. In such way, the operation of printing the image can be executed.

Furthermore, in the image printing section 4, when the laser beam scanned by the polygon mirror 24 is directed as an incident light onto the synchronization detector 27 immediately in front of the photosensitive body 25 through the fθ lens 26, the synchronization detector 27 outputs the synchronization detecting pulse signal XDETP to the signal processing section 3.

The signal processing section 3 outputs the timing control signal to the buffer memory 17 on the basis of the synchronization detecting pulse signal XDETP from the synchronization detector 27, and thereby, the image data primarily stored in the buffer memory 17 are divided into two lines of the image data and read out in order with an adequate timing. The image data thus read out are sent to the print output (terminal) of the image print section 4.

FIG. 2 is a block diagram showing an embodiment of the data processing apparatus in the digital copying machine 1 according to the present invention including a buffer memory 17, a print control section 18, an FIFO memory 19 employed as a delay medium, and the circumferential circuits thereof. In such digital copying machine 1, the raster image data inputted in order line by line by use of the buffer memory 17, the print control section 18, the FIFO memory, and the circumferential circuit thereof are processed with the smoothing process and converted to the two-lines data with the timing in synchronism with the print clocks of different phases.

The scanning positions of the two-lines laser beams from the polygon mirror 24 are parted to some extent (predetermined distance) in the main scanning direction. The timings of emitting the two-lines laser beams are respectively different from each other in the phase thereof. Therefore, it is necessary to control the timings individually.

At the time of detecting the synchronization when the synchronization detector 27 detects the laser beam just in front of the photosensitive body 25 and outputs the synchronization detecting pulse signal XDETP, the print control section 18 lights up both of the LD units 21a and 21b with the light emitting timing mutually different in the phase through the delay medium 19 and the LD modulation sections 21a and 21b. On this occasion, the print control section 18 controls separately the light emitting timing of the LD units 21a and 21b.

The synchronization detector 27 detects the two lines of the laser beam from the fθ lens 26 just in front of the photosensitive body 25 and outputs twice the synchronization detecting pulse signal XDETP per one surface of the polygon mirror 24.

Figure 1A:
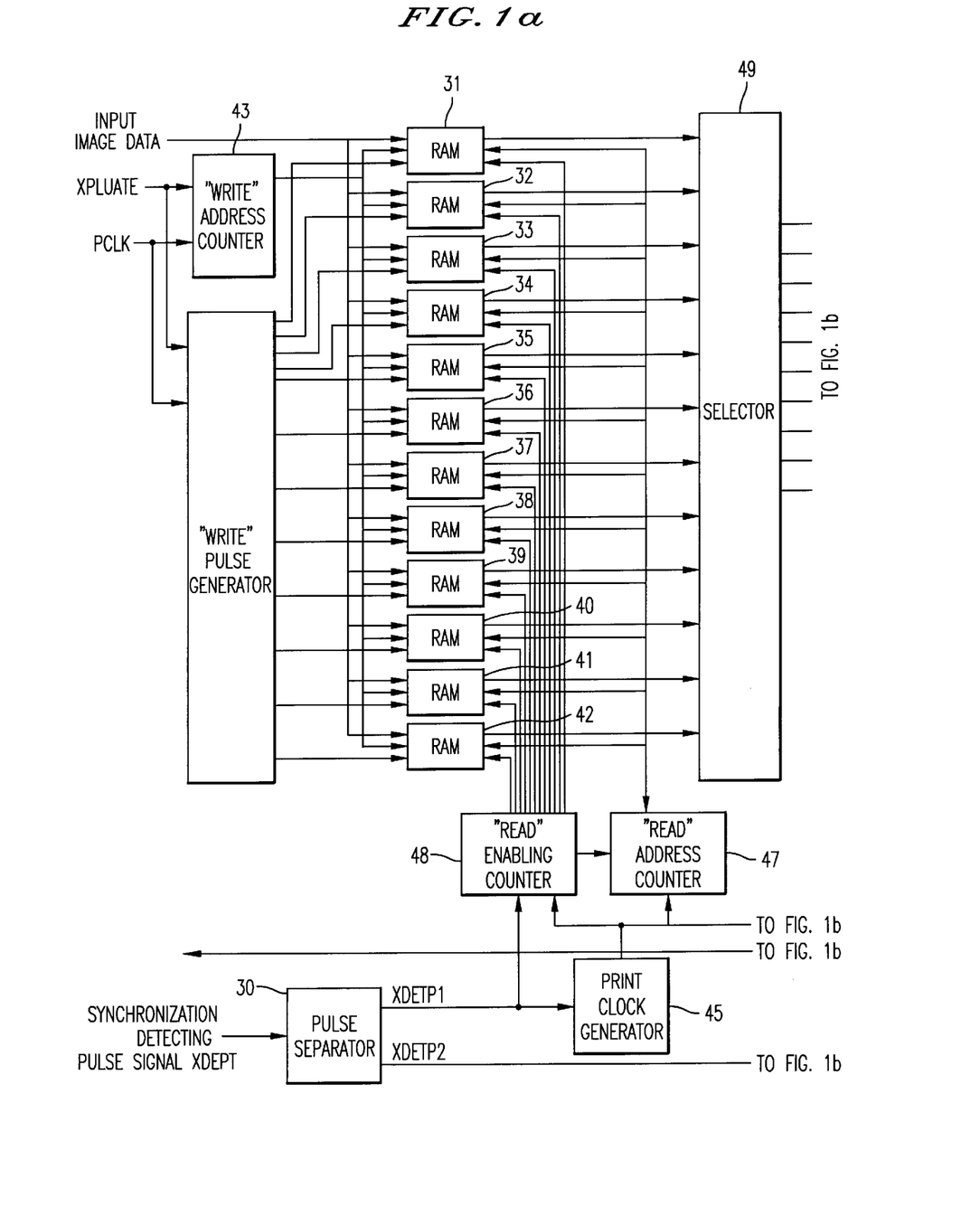
FIG. 1 is a block diagram showing a circuit of an embodiment according to the present invention constructed with a buffer memory, a print control section, an FIFO memory and the circumferential circuits thereof.
Figure 1B:
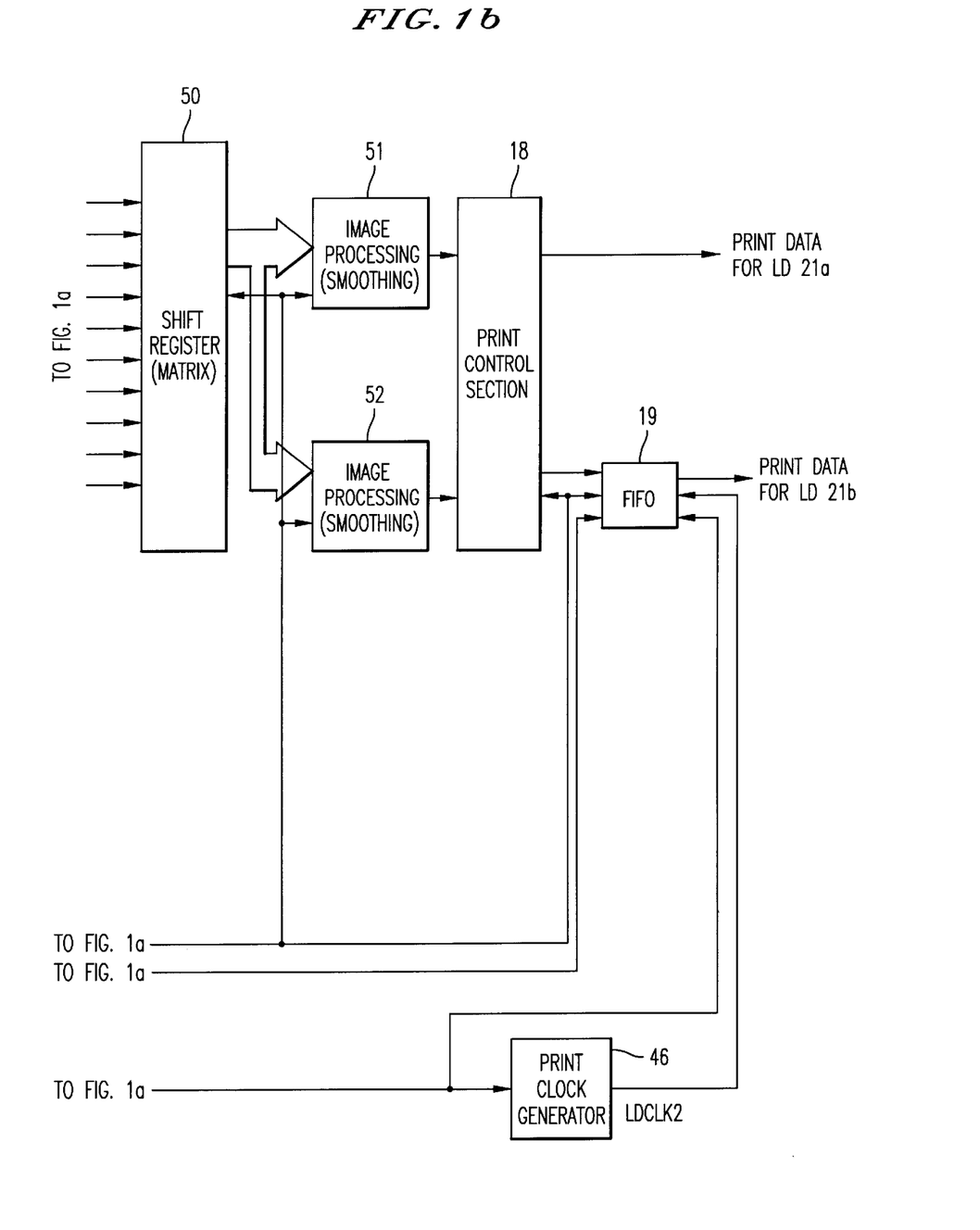

The synchronization detecting pulse signal XDETP from the synchronization detector 27 is inputted to a pulse separator 30, shown in FIG. 1, and the pulse signal XDETP is divided into the LD unit 21a synchronization detecting pulse signal XDETP 1 corresponding to the laser beam from the LD unit 21a and the LD unit 21b synchronization detecting pulse signal XDETP 2 corresponding to the laser beam from the LD unit 21b, in the pulse separator 30. Furthermore, four lines of the matrix needed for the smoothing process are provided before and after the line including the pixel to be noted, and the total number of the lines turns out to be nine.

To facilitate the explanation, in the RAMs 31–42 for constructing the buffer memory 17, the writing-in address signal, the writing-in data, the reading-out address signal, and the reading-out data are inputted or outputted from the separated terminals of the buffer memory 17. However, in the same memory, since the writing-in data and the reading-out data don't occur at the same time, it may be possible to realize the same structure of an ordinary RAM in which there is no distinction between the writing-in and the reading-out in the terminal for inputting the address signal and the ordinary RAM is commonly used and has the common terminal for inputting and outputting the writing-in data and the reading-out data in the both directions. As to the buffer memory 17, an FIFO memory can be also used for automatically incrementing the address.

The RAMs 31–42 are random access memories (RAMs) capable of writing in and reading out the data. The respective memories have memory capacitance capable of storing the image data of more than one lines. The input image data are generated in order line by line in the image processing section 16 employed as the data inputting medium in synchronism with the input clock PCLK at the rate of two lines per the synchronization detecting pulse signal XDETP 1.

The input image data from the image processing section 16 are inputted to all of the RAMs 31–42 as the writing-in data. The XPLGATE signal is a signal showing an effective area of the input image data in the main scanning direction, and the signal is inputted to the writing-in address counter 43 and the writing-in pulse generator 44 and the same signal is made active per every line. The writing-in address counter 43 is reset when the XPLGATE signal is made active and incremented by the input clock PCLK at this time.

The counting value output of the writing-in address counter 43 shows the position in the main scanning direction, and the counting value output thereof is inputted to the writing-in address input terminal of all RAMs 31–42 as the writing-in address signal. The writing-in pulse generator 44 generates the writing-in pulse so as to perform the operation of writing in the image data in order line by line into the RAMs 31–42 and inputs the generated pulse to the RAMs 31–42.

On this occasion, in the writing-in pulse generator 44, two RAMs for writing in the data thereto among the RAMs 31–42 and ten RAMs for reading out the data therefrom are both changed in order. At this time, the writing-in pulse is generated and inputted into the RAMs 31–42 such that two lines of data from the image processing section 16 are written in line by line in order in synchronism with the input clock PCLK into two RAMs during the time period when the image data are read out from ten RAMs. The above operation is performed repeatedly.

As the print clock generator, two print clock generators 45 and 46 are employed. The synchronization detecting pulse signal XDETP1 for the LD unit 21a is inputted from the pulse separator 30 to the print clock generator 45, while the synchronization detecting pulse signal XDETP2 for the LD unit 21b is inputted from the same pulse separator 30 to the print clock generator 46.

The print clock generators 45 and 46 generate, respectively, print pixel clocks LDCLK1 and LDCLK2, the phase of which are respectively synchronized with the timings of the LD unit 21a synchronization detecting pulse signal XDETP1 and the LD unit 21b synchronization detecting pulse signal XDETP2 both generated from the pulse separator 30.

The operations of a read address counter 47 for generating the timing of reading out the RAMs 31–42, a read enable generator 48, and the print control section 18, and the writing-in operation of the FIFO memory 19, all are performed in synchronism with the synchronization detecting pulse signal XDETP1 for the LD unit 21a from the pulse separator 30. The print clock generators 45 and 46 are composed of a crystal oscillator and a PLL frequency synthesizer.

The synchronization detecting pulse signal XDETP1 for the LD unit 21a from the pulse separator 30 is outputted to the image inputting section in the image processing section 16. The signal is employed for obtaining the timing of generating the input image data.

The read enable generator 48 outputs the read enable signal to the ten RAMs to which the data are not written in such that the read enable signal is outputted to the RAMs 33–42 during the time period when the data are written in to the RAMs, for instance, the RAMs 31 and 32 to which the data are not written in per the synchronization detecting pulse signal XDETP1 from the pulse separator 30, while the read enable signal is outputted to the RAMs 31, 32, and 35–42 during the time period when the data are written in to the RAMs 33 and 34.

In the read enable generator 48, the timing of making active the read enable is programmable. The print starting location and the print ending location both in the main scanning direction of the image data are determined by the above programmable timing.

The read address counter 47 is reset when the read enable signal from the read enable generator 48 becomes active and incremented by the print pixel clock LDCLK1 from the print clock generator 45. The count value output of the read address counter 47 represents the location of the image data to be printed in the main scanning direction, and the count value output thereof is respectively inputted to the read address input terminals of all RAMs 31–42.

The image data read out from the RAMs 31–42 are inputted to a selector 49. The selector 49 inputs the data from the ten RAMs reading out the data in the state of making active the read enable signal among the twelve RAMs 31–42 to a shift register group 50 for changing the data in the form of matrix in the order of the old one. The shift register group 50 has a width of 10 lines data and shifts the data inputted by the selector 49 by use of the print pixel clock LDCLK1 from the print clock generator 45. For instance, the above shift register is the one having a length of 13 bit and forms a matrix of 13 pixels length. Thereby, the shift register forms a matrix of 10 lines in the subscanning direction and of 13 pixels in the main scanning direction. The data of this matrix are shifted per each print pixel clock LDCLK1, and thereby the pixel to be noted is changed in order.

The matrix data of the 9 lines excluding the newest line data among the 10 lines matrix data are inputted to an image processing section 51 composed of the smoothing processing circuit for determining the LD unit 21a image data employed for the purpose of modulating the LD unit 21a. On the other hand, the matrix data of the 9 lines excluding the oldest line data among the 10 lines matrix data are inputted to another image processing section 52 composed of the smoothing processing circuit for determining the LD unit 21b image data employed for the purpose of modulating the LD unit 21b.

The smoothing processing circuits 51 and 52 extract the characteristic of the pixel to be noted by use of the matrix formed by the 9 lines in total including a line of the pixel to be noted, 4 lines preceding thereto and 4 lines subsequent thereto in the subscanning direction, and the 13 pixels in total including the pixel to be noted, 6 pixels preceding thereto and 6 pixels subsequent thereto, all of which are inputted from the shift registers 50. Furthermore, the circuits 51 and 52 convert the image data and output the converted image data to the print control section 18 in order to determine the lighting-up time and the lighting-up timing so as to reduce the extent of the slanted line of the image edge portion and the notches of the circular arc thereof.

The print control section 18 practices various processings such as area limitation and pattern composition to the image data of two lines from the smoothing processing circuits 51 and 52. The two lines image data from the smoothing processing circuits 51 and 52. The two lines image data from the print control section 18 have a timing same as the light-emitting timing of the LD unit 21a, and the data are synchronized with the synchronization detecting pulse signal XDETP1 for the LD unit 21a from the pulse separator 30. For this reason, the processing of the two lines image data differs from the handling of the two lines image data respectively having different phases. Instead, the processing has many portions capable of employing common signal processing circuit(s) for the respective lines image data.

The LD unit 21a input data outputted from the print control section 16 are inputted to the LD modulation section 20a as the print data (image data for printing). The LD unit 21b image data outputted from the print control section 18 are inputted to the FIFO memory 19 and delayed by the FIFO memory 19 by the time corresponding to the distance of two lines laser beam radiated on the photosensitive body 25 in the main scanning direction. The image data from the FIFO memory 19 are inputted to the LD modulation section 20b as the print data.

Figure 3A:
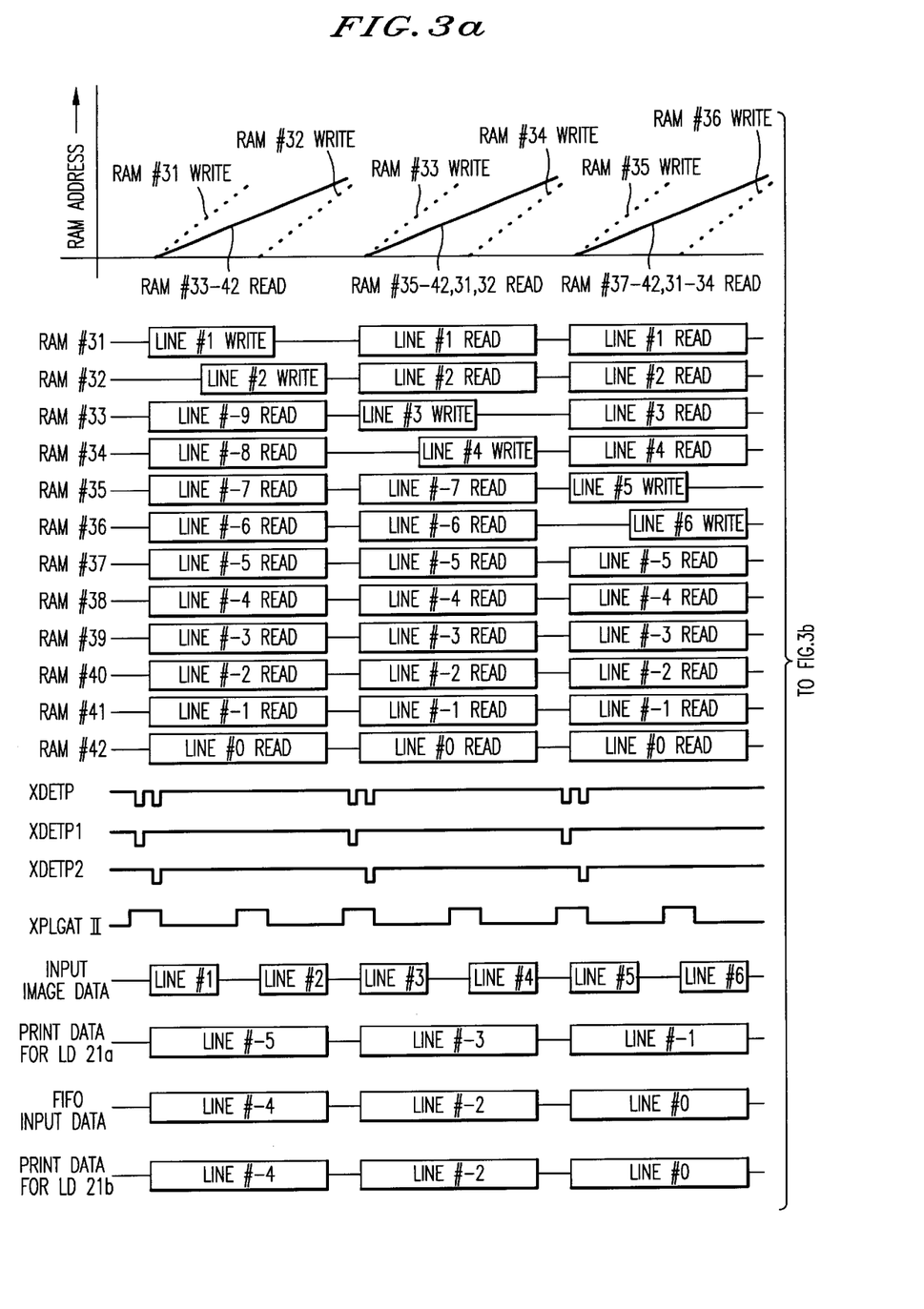
FIG. 3 is a timing chart for illustrating the operational timing of the embodiment.
Figure 3B:
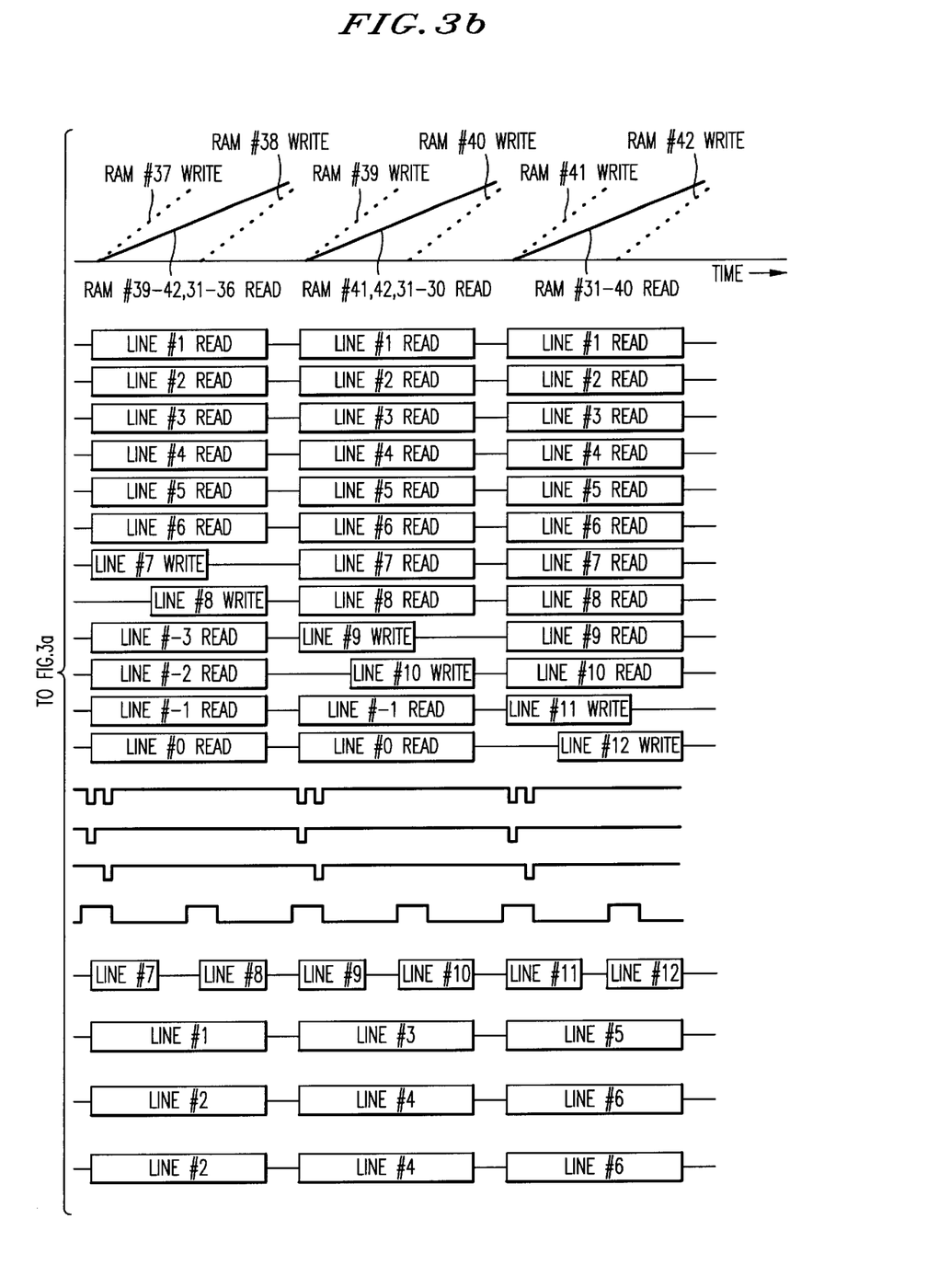

FIG. 3 shows the operation timing of the embodiment of the present invention. Next, the operation of the buffer memory 17 in the embodiment of the invention is explained hereinafter referring to FIG. 3. At the upper side of FIG. 3, the "Write" address of the respective RAMs 31–42 and the "Read" address thereof are shown. In the upper side of FIG. 3, the vertical axis shows the time and the horizontal axis shows the addresses of the RAMs 31–42. Furthermore, the stout dotted line shows the "Write" addresses of the respective RAMs 31–42 and the stout solid line shows the "Read" addresses thereof. The RAM from which the image data are read out and written in is drawn out from those solid line and dotted line and noted the RAM therefrom.

When the two lines of laser beam scanned by the polygon mirror 24 are directed as the incident light rays onto the synchronization detector 27 immediately before the photosensitive body 25 in the main scanning direction, the synchronization detecting pulse signal XDETP is outputted from the synchronization detector 27. On this occasion, since the scanning positions of the two lines of laser beam from the polygon mirror 24 are separated (parted) to some extent in the main scanning direction, two pulses of the synchronization detecting pulse signal XDETP from the synchronization detector 27 per one-time scanning of the two lines of the laser beam by use of one surface of the polygon mirror 24.

In the pulse separator 30, the synchronization detecting pulse signal XDETP from the synchronization detector 27 is divided into two signals; those are the LD unit 21a synchronization detecting pulse signal XDETP1 corresponding to the laser beam from the LD unit 21a and the LD unit 21b synchronization detecting pulse signal XDETP2 corresponding to the laser beam from the LD unit 21b. The image input section in the image processing section 16 receives the synchronization detecting pulse signal XDETP1 from the synchronization detector 27 and outputs the image data for which various processings are practiced in such manner as mentioned above together with the signal XPLGATE line by line in order at the rate of two lines per one period of the synchronization detecting pulse signal XDETP1 in synchronism with the clock PCLK.

The count value of the "Write" address counter 43 showing the "Write" address of the RAMs 31–42 is incremented by the input clock PCLK during the effective time period of the signal XPLGATE. Since the "Write" pulse generated from the "Write" pulse generator 44 and applied to the RAMs 31–42 is changed over in order line by line, the image data are written in line by line in order into the 12 RAMs 31–42 in the order from the first pixel, as showing the "Write" address by the heavy dotted line at the upper side of FIG. 3.

On the other hand, regarding the reading-out of the image data, during one period of the synchronization detecting pulse signal XDETP, the image data of the respective lines are read out in the order from the first pixel, as shown the "Read" address by the heavy solid lien at the upper side of FIG. 3, during the time period when the read enable signal from the read enable generator 48 becomes active in synchronism with the print pixel clock LDCLK1, at the same time from the 10 RAMs other than the 2 RAMs to which the image data are written in during the first period.

Among the data read out at the same time from the 10 RAMs among the 12 RAMs 31–42, the 9 groups of data excluding the newest group (1 line) of data and the 9 groups of data excluding the oldest group (1 line) of the data are inputted from the shift register 50, respectively, to the smoothing processing circuits 51 and 52.

The smoothing processing circuits 51 and 52 extract the feature of the pixel to be noted by use of the matrix formed by the image data with the total 9 lines composed of the line including the noted pixel, the 4 lines preceding thereto, and the 4 lines subsequent thereto, in the subscanning direction, and with the total 13 pixels composed of the noted pixel, the 6 pixels preceding thereto, and the 6 pixels subsequent thereto in the main scanning direction. Furthermore, the circuits 51 and 52 determine the image data for deciding the lighting-up time and the lighting-up timing, etc. of the laser beam in order to reduce the extent of the slanted line of the image edge portion and the notches of the circular arc thereof, and the image data thus determined are outputted to the print control section 18 as the print data for the two LD units 21a and 21b.

The lower side of FIG. 3 represents the respective modes of the 12 RAMs 31–42. The RAM 31 performs in the below-mentioned order the writing-in operation of the image data and the reading-out operation thereof; those operations are, the writing-in of the image data on the line #1 (first line), the 5-times reading-out of the image data on the line #1, the writing-in of the image data on the line #13 (thirteenth line), and the 5-times reading-out of the image data on the line #13. The RAM 32 performs in the below-mentioned order the writing-in operation of the image data and the reading-out operation thereof, those operations are, the writing-in of the image data on the line #2 (second line), the 5-times reading-out of the image data on the line #2, the writing-in of the image data on the line #14 (fourteenth line), and the 5-times reading-out of the image data on the line #14.

The RAMs 33–42 simultaneously read out the image data of the preceding lines #−9~#0 during the time period when the image data on the lines #1 and #2 are written into the RAMs 31 and 32. The image data on the lines #−9~#0 are converted to a matrix by use of the shift register 50, and the image data of the noted pixel on the line #−5 are decided among the image data on the lines #−9~#−1 by the smoothing processing circuit 51 for use in the LD unit 21a. The image data thus decided are outputted as the data for modulating the LD unit 21a.

Furthermore, the image data of the noted pixel on the line #−4 are decided among the image data on the lines #−8~#−0 by the smoothing processing circuit 52 for use in the LD unit 21b. The image data thus decided are outputted as the data for modulating the LD unit 21b.

In the next cycle of the synchronization detecting pulse signal XDETP1, the writing-in operation of the image data on the lines #3 and #4 for the RAMs 33 and 34 are performed in order during the time period when the image data on the lines #1 and #2 are read out from the RAMs 31 and 32. At this time, in the RAMs 34–42, the image data on the preceding lines (lines #7 through #0) are read out again.

In this cycle of the synchronization detecting pulse signal XDETP1, in the smoothing processing circuits 51 and 52, the image data on the lines #−3 and #−2 are respectively outputted therefrom as the pixel to be noted and as the data for modulating the LD units 21a and 21b. In such way, by changing over the operation of the RAMs 31–42 in a proper order, the frequency of the data is changed during the time period of performing the image processing, and at the same time the processed image data are converted to the two-lines data.

Figure 4:
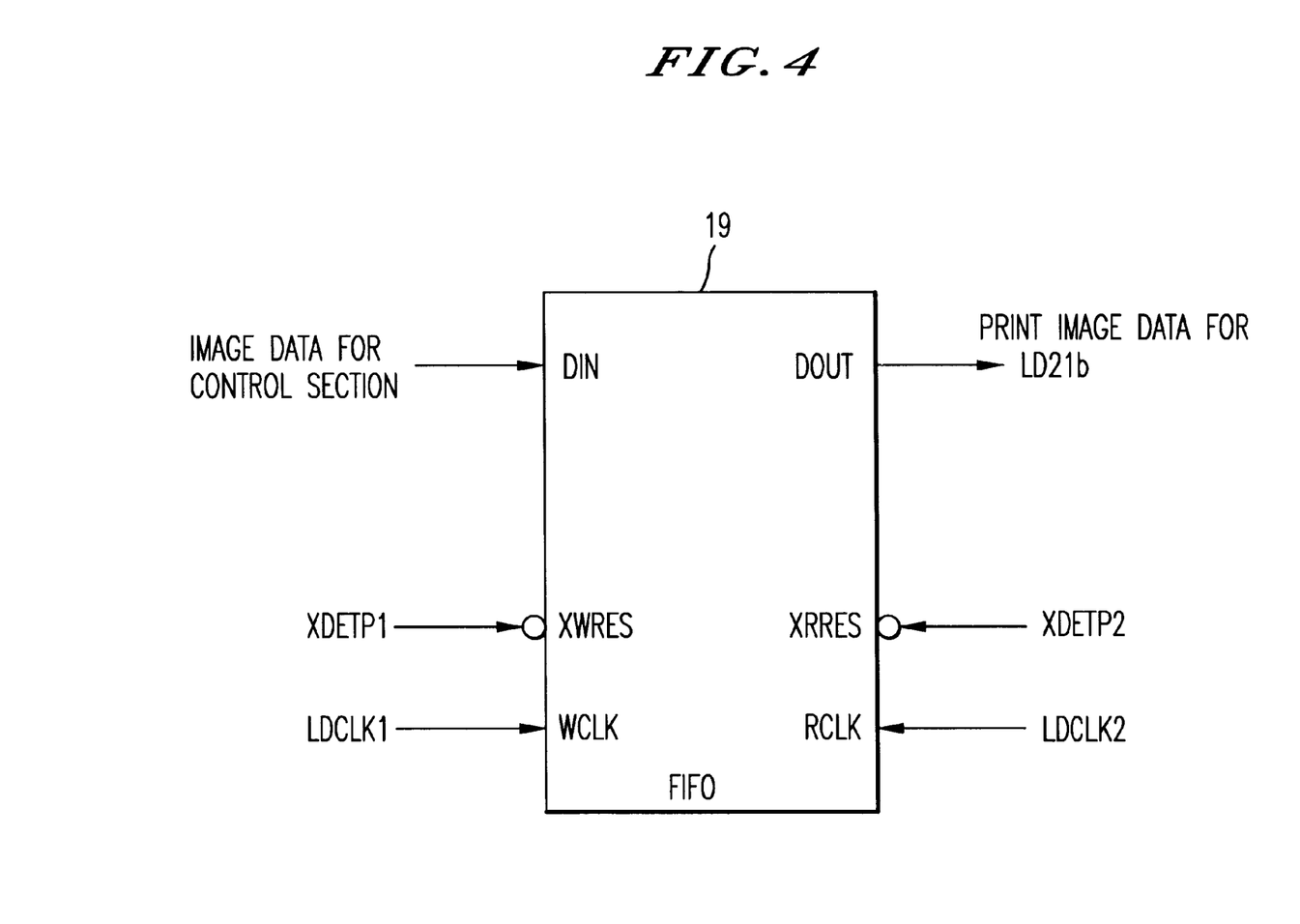
FIG. 4 is a block diagram showing the terminals of the FIFO memory in the embodiment.

Next, the delaying operation of the image data by the FIFO memory 19 is explained hereinafter. FIG. 4 shows the terminals of the FIFO memory 19. It is sufficient that the FIFO memory 19 has a memorizing capacity capable of memorizing a pixel number more than that corresponding to the distance between the two lines of laser beam of the image data radiated from the fθ lens 26 onto the photosensitive body 25. The FIFO memory 19 independently practices the writing-in of the image data and the reading-out of the image data.

To state in more detail, the FIFO memory 19 includes an input terminal Din for receiving the image data to be written in, an output terminal Dout for outputting the image data to be read out, an input terminal XWRES for receiving the writing-in reset signal, an input terminal XRRES for receiving the writing-in reset signal, an input terminal WCLK for receiving the writing-in clock, an input terminal RCLK for receiving the reading-out clock, a writing-in address pointer not shown for pointing the writing-in address, and a reading-out address pointer (not shown) for pointing the reading-out address.

In such structure, the input terminal having a head X among the input terminals of the FIFO memory 19 signifies that the signal thereof is an active "Low". In the FIFO memory 19, the writing-in address pointer resets the writing-in address to be pointed to "0" by use of the writing-in reset signal, and increments in order the writing-in address by use of the writing-in clock. The writing-in address reaches the last address of the FIFO memory 19, and thereafter the reading-out address pointer resets the reading-out address to "0" by the next reading-out clock and further increments in order the reading-out address by the reading-out clock.

In the similar way, the reading-out address pointer resets the reading-out address to be pointed out to "0" by use of the reading-out reset signal and increments in order the reading address by use of the reading-out clock. After the reading-out address reaches the final address of the FIFO memory 19, the reading-out address pointer resets the reading-out address to "0" by the next reading-out clock and increments in order the reading-out address by the reading-out clock further read out.

As shown in FIG. 4, in the FIFO memory 19 of this embodiment, the LD unit 21b image data are inputted as the image data to the input terminal Din from the print control section 18. The LD unit 21b image data read out from the output terminal Dout are outputted to the LD modulating section 20b.

The LD unit 219 has synchronization detecting pulse signal XDETP1 from the pulse separator 30 inputted to the input terminal XWRES as a writing reset signal.

Furthermore, in the FIFO memory 19, the LD unit 21b synchronization detecting pulse signal XDETP2 from the pulse separator 30 is inputted to the input terminal XRRES as the reading-out reset signal. The print pixel clock LDCLK 1 from the print clock generator 45 is inputted to the input terminal WCLK as the writing-in clock, while the print pixel clock LDCLK 2 from the print clock generator 46 is inputted to the input terminal RCLK as the reading-out clock.

Figure 5:
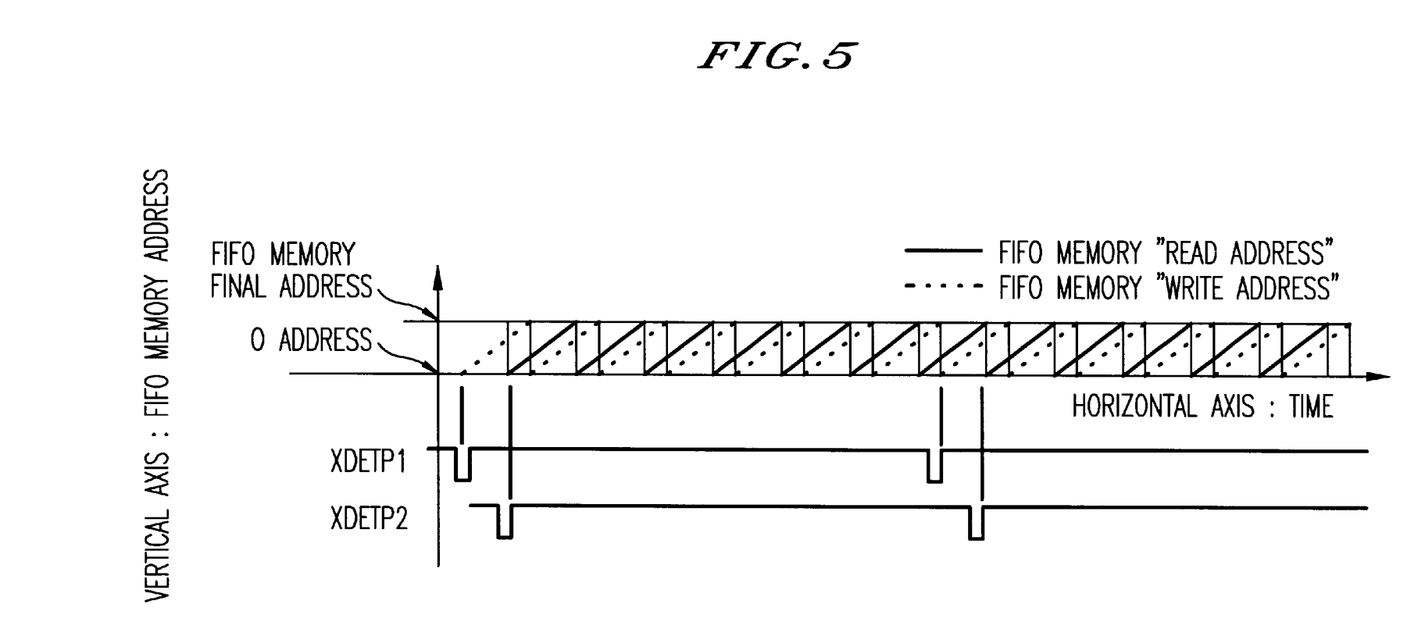
FIG. 5 is a timing chart for illustrating the relationship between the address of the FIFO memory and the time thereof and for illustrating the timing of the synchronization detecting pulse signal.

FIG. 5 shows, as an example, the relationship between the address and the time of the FIFO memory 19 and the timings of the synchronization detecting pulse signals XDETP1 and XDETP2.

In the portion showing the relationship between the address and the time of the FIFO memory 19 in FIG. 5, the vertical axis shows the address thereof and the horizontal axis shows the time thereof. In FIG. 5, the dotted line signifies the writing-in address of the image data to be written in into the FIFO memory 19, while the solid line signifies the reading-out address of the image data to be read out from the FIFO memory 19. In the FIFO memory 19, the writing-in frequency is equal to the reading-out frequency.

In the case of writing in the image data into the FIFO memory 19, in the FIFO memory 19, the writing-in address, pointed to by the writing-in address pointer by the action of the LD unit 21a synchronization detecting pulse signal XDETP1 firstly sent from the pulse separator 30 as the writing-in reset signal, is reset and thereafter the print pixel clock LDCLK1 sent from the print clock generator 45 as the writing-in clock transits from the low level to the high level. At this time, the image data are written in into the writing-in address.

In the FIFO memory 19, the writing-in address pointed to by the writing-in address pointer is incremented whenever the writing-in operation is practiced, and the image data are written in from the writing-in address "0" in order. However, in case that the length of the one-line image data exceeds the memorizing capacitance of the FIFO memory 19, since the writing-in address pointed by the writing-in address pointer circulates one or more times, the FIFO memory 19 writes in the image data plural times into the same writing-in address of the FIFO memory 19 during the time period when the one-line image data are written in into the FIFO memory 19.

Furthermore, in the case of reading out the image data from the FIFO memory 19, the reading-out address, pointed to by the reading-out address pointer by the action of the LD unit 21b synchronization detecting pulse signal XDETP2 firstly sent from the pulse separator 30 as the reading-out reset signal, is reset and thereafter the point pixel clock LDCLK2 sent from the print clock generator 46 as the reading-out clock transits from the low level to the high level. At this time, the image data are read out from the reading-out address.

In the FIFO memory 19, the reading-out address pointed by the reading-out address pointer is incremented whenever the reading-out operation is practiced, and the image data are read out from the reading-out address "0" in order. However, in case that the length of the one-line image data exceeds the memorizing capacitance of the FIFO memory 19, since the reading-out address pointed by the reading-out address pointer circulates one or more times, the FIFO memory 19 reads out the image data plural times from the same reading-out address of the FIFO memory 19 during the time period when the one-line image data are read out from the FIFO memory 19.

Since the frequency of the print pixel clock LDCLK1 transmitted from the print clock generator 45 as the writing-in clock is the same as that of the print pixel clock LDCLK2 transmitted from the print clock generator 46 as the reading-out clock, the writing-in of the image data and the reading-out of the image data are alternately performed for the same address of the FIFO memory 19 as shown in FIG. 5. In such manner as mentioned heretofore, the delay of the image data can be realized by use of the FIFO memory 19.

In this embodiment, two lines of laser beam write in the image on the photosensitive body 25 per two lines. However, the present invention can be also applied similarly to the case in which the scanning positions by the n lines of laser beam are respectively separated in order at a predetermined distance in the main scanning direction and the laser beams thus separated write in the image on the photosensitive body 25 per n lines. The number n is an integer equal to or greater than two. In the embodiment on this occasion, more than m memories having a memory capacitance capable of memorizing one or more lines of the image data in the dot-matrix state transmitted from the image processing section 16 as the data inputting medium are employed in the buffer memory 17, and further a light source composed of the n LD units is employed instead of the two LD units 21a and 21b.

The scanning positions of the n laser beams from the polygon mirror 24 are separated in order at a predetermined distance in the main scanning direction. The print control section 18 lights up the n LD units through the (n−1) delay media and the n LD modulation section with the light emission timings mutually different in the phases thereof.

The n lines of light beam generated by the n LD units are composed by the beam composing medium, and thereafter transmitted through the cylinder lens 23 and deflected and scanned at the same time by the polygon mirror 24, and then the light beams thus deflected and scanned are focused on the photosensitive body 25 and the synchronization detector 27 through the fθ lens 26. The pulse separator 30 separates the synchronization detecting pulse signal XDETP from the synchronization detector 27 into the synchronization signals composed of the n synchronization detecting pulse signals corresponding to the n lines of laser beam from the n LD units, and further the (n−1) print clock generators are employed instead of the print clock generators 45 and 46.

The synchronization detecting pulse signal of the earliest timing among the n synchronization detecting pulse signals from the pulse separator 30 is outputted to the image input section in the image processing section 16, and employed therein in order to obtain the timing for generating the input image data. The "Write" address counter 43 is reset when the XPLGATE signal is made active and incremented by the input clock PCLK.

The output of the counting value of the "Write" address counter 43 shows the position in the main scanning direction, and the output is inputted to the "Write" address input terminals of all the above-mentioned m memories as the "Write" address signal. The "Write" pulse generator 44 generates the "Write" pulse so as to write in line by line repeatedly in order into the above m memories, and inputs the image data into the above m memories.

On this occasion, the "Write" pulse generator 44 generates the "Write" pulse such that the n lines of data from the image processing section 16 are written in line by line in order into the n memories among the above-mentioned m memories in synchronism with the input clock PCLK during the time period when the (m−n) lines of data are read out at the same time in synchronism with the print clock of the earliest timing among the n print clocks from the memories excluding the above n memories among the above-mentioned memories equal to or more than m. The aforementioned n print clock generators generate the n print clocks (print pixel clocks) which are respectively synchronized with the n synchronization signals from the pulse separator 30.

The "Read" enabling generator 48 outputs the "Read" enabling signal to the (m−n) memories not performing the writing-in of data per each synchronization detecting pulse signal of the earliest timing among the n synchronization detecting pulse signals from the pulse separator 30. The "Read" address counter 47 is reset when the "Read" enabling signal becomes active and incremented by the print pixel clock of the earliest timing among the (n−1) print pixel clocks. The count value output of the "Read" address counter 47 represents the position of the image data to be printed in the main scanning direction and the count value output thereof is inputted to the "Read" address input terminal of all of the aforementioned m memories.

The image data read out from the above m memories are inputted to a selector 49. The selector 49 inputs the image data to a shift register group 50 for converting the data from the memories, which read out the data when the "Read" enabling signal is made active, to the matrix form in the order from the old data. The shift register group 50 shifts the data inputted from the selector 49 by the print pixel clock of the earliest timing among the (n−1) print pixel clocks from the aforementioned (n−1) print clock generators.

The n matrix data respectively shifted line by line in order are respectively inputted to the image processing section composed of the n smoothing process circuits. Those smoothing process circuits extract the feature of the images to be noted in accordance with the matrix data respectively inputted from the shift register 50, convert the image data in order to decide the lighting-up time and the lighting-up timing for the laser beam so as to reduce the extent of the slanted line of the image edge portion and the notches of the circular arc thereof, and output the image data thus converted to the print control section 18.

The print control section 18 practices various processings such as area limitation and pattern composition for the n lines of the image data from the n smoothing process circuits. The first line of the image data among the n lines of the image data from the print control section 18 are inputted to the (one) LD modulation section as the print data (image data for printing). The LD modulation section drives one LD unit by the print data.

Furthermore, the other (n−1) lines of the image data outputted from the print control section 18 are respectively delayed by the time corresponding to the distance of the n laser beams radiated on the photosensitive body 25 in the main scanning direction by the (n−1) FIFO memories employed as a delay medium. The image data from those FIFO memories are inputted to the (n−1) LD modulation section as the print data, and those (n−1) LD modulation sections respectively drive (n−1) LD units by the (n−1) print data.

The fundamental structure and operation of the present invention have been described heretofore. The advantageous functional effects of the first and second aspects of the present invention are further explained on the basis of the above descriptions.

The data processing device of the first aspect of the invention includes the data inputting medium, the memories equal to or more than m, the memory writing-in medium, the memory reading-out control medium, and the n image processing media. As described, the data inputting medium is the image processing section 16. The memory writing-in medium is composed of the "Write" address counter 43 and the "Write" pulse generator 44. The memory reading-out control medium is composed of the "Read" address counter 47 and the "Read" enabling generator 48. The n image processing media are composed of the n smoothing process circuits.

In such structure, the image processing of the data transmitted in order line by line with the timing in synchronism with the input clock can be performed in accordance with the information of the circumferential pixels including the subscanning direction. Furthermore, utilizing the memory necessary for the image processing, the data transmitted in order line by line with the timing in synchronism with the input clock can be converted to the plural lines image data of the timing in synchronism with the print clock.

The data processing device of the second aspect of the invention includes the data inputting medium, the memories equal to or more than m, the memory writing-in medium, the memory reading-out control medium, the n image processing media, and a delay medium. As above described, the data inputting medium is the image processing section 16. The memory writing-in medium is composed of the "Write" address counter 43 and the "Write" pulse generator 44. The memory reading-out control medium is composed of the "Read" address counter 47 and the "Read" enabling generator 48. The n image processing media are composed of the n smoothing process circuits.

According to the second aspect of the invention, the image processing of the data transmitted in order line by line with the timing in synchronism with the input clock can be performed in accordance with the information of the circumferential pixels including the subscanning direction. Furthermore, utilizing the memory necessary for the image processing, the data transmitted in order line by line with the timing in synchronism with the input clock can be converted to the plural lines image data with timing in synchronism with the print clock.

Furthermore, the image data of plural lines which are different in phase from each other can be obtained by use of the (n−1) delay media, and the signal processing circuit can be commonly used with the plural lines image data for modulating the plural lines light beam. Consequently, a low-cost apparatus can be realized.

Although the embodiments according to the present invention is described heretofore, the invention is not limited to those embodiments.

Obviously, many other numerous embodiments and modifications thereof according to the present invention are possible in light of the above teachings. It is therefore to be understood that within the scope of the appended claims, the invention may be practiced otherwise than as specifically described herein.

What is claimed is:

1. A data processing device for simultaneously reading out plural lines of image, comprising:
   a data inputting mechanism configured to generate line by line in order dot-matrix-state data in synchronism with an input clock;
   at least m memories having a memorizing capacity capable of memorizing one or more lines of said dot-matrix-state data generated by said data inputting medium, wherein m is an integer equal to or greater than n×2, and n is another integer equal to or greater than two;
   a memory writing-in mechanism configured to write the dot-matrix-state data from said data inputting mechanism line by line in order into said at least m memories in synchronism with the input clock during a write-in period;

a memory reading-out control mechanism configured to write in n lines of data generated by said data inputting mechanism line by line in order into n memories among said at least m memories in synchronism with the input clock, to simultaneously read out (m–n)-lines of data from memories other than said n memories in synchronism with a printing clock during said write-in period, and to change the memory for reading out the data stored in said at least m memories and repeating the operation of reading-out the image data whenever the n-lines of data are written into said n memories; and n image processing mechanisms configured to output printing image data on respective lines on the basis of plural-lines of image data read out from said n memories.

2. A data processing device for simultaneously reading out plural lines of image comprising:

a data inputting mechanism configured to generate line by line in order dot-matrix-state data in synchronism with an input clock;

at least m memories having a memorizing capacity capable of memorizing one or more lines of said dot-matrix-state data generated by said data inputting mechanism, wherein m is an integer equal to or greater than n×2, and n is another integer equal to or greater than two;

a memory writing-in mechanism configured to write in the dot-matrix-state data from said data inputting mechanism line by line in order into said at least m memories synchronism with the input clock during a write-in period;

a memory reading-out control mechanism configured to write in n lines of data generated by said data inputting mechanism line by line in order into n memories among said at least m memories in synchronism with the input clock, to simultaneously read out (m–n)-lines of data from memories other than said n memories in synchronism with a printing clock of an earliest timing among n printing clocks during the write-in period, and to change the memory for reading out the data stored in said at least m memories and repeating the operation of reading-out the image data whenever the n-lines of data are written in into said m memories;

n image processing mechanism configured to output printing image data on respective lines on the basis of the plural-lines data read out from said m memories; and (n–1) delay mechanism configured respectively to delay the data on (n–1) respective lines other than the data on the line to be printed with the earliest timing among the data, and respectively having delay times different from each other and outputted from said n image processing mechanism.

3. A method of simultaneously reading out plural lines of image in a data processing device, comprising the steps of:

generating line by line in order dot-matrix-state data in synchronism with an input clock by use of a data inputting mechanism;

storing said dot-matrix-state data generated by said data inputting medium mechanism in at least m memories having a memorizing capacity capable of memorizing one or more lines of said dot-matrix-state data, wherein m is an integer equal to or greater than n×2 and n is another integer equal to or greater than two;

writing in the dot-matrix-state data from said data inputting mechanism line by line in order into said at least m memories in synchronism with the input clock by use of a memory writing-in mechanism;

writing in n lines of data generated by said data inputting mechanism line by line in order into n memories among said at least m memories in synchronism with the input clock during a write-in period;

simultaneously reading out (m–n)-lines of data from the at least m memories other than said n memories in synchronism with a printing clock during said write-in period;

changing the memory for reading out the data stored in said at least m memories;

repeating the operation of reading out the image data whenever said n-lines of data are written in into said m memories; and outputting printing image data on respective lines on the basis of the plural-lines data read out from said memories.

4. A method of simultaneously reading out plural lines of image in a data processing device, comprising the steps of:

generating line by line in order dot-matrix-state data in synchronism with an input clock by use of a data inputting mechanism;

causing storing said dot-matrix-state data generated by said data inputting mechanism into at least m memories having a memorizing capacity to memorize one or more lines of said dot-matrix-state data generated by said data inputting medium, wherein m is an integer equal to or greater than n×2 and n is another integer equal to or greater than two;

writing in the dot-matrix-state data from said data inputting medium line by line in order into said at least m memories in synchronism with the input clock by use of a memory writing-in mechanism;

writing in n lines of data generated by said data inputting mechanism line by line in order into n memories among said at least m memories in synchronism with the input clock during a write-in period;

simultaneously reading out (m–n)-lines of data from the memories other than said n memories in synchronism with a printing clock of the earliest timing among n printing clocks during said write-in period;

changing the memory for reading out the data stored in said at least m memories;

repeating the operation of reading out the image data whenever said n-lines of data are written in into said m memories;

outputting printing image data on respective lines on the basis of the plural-lines data read out from said memories; and delaying data on (m–1) respective lines other than the data on the line to be printed with the earliest timing among the data, with respective delay times different from each other.

* * * * *